United States Patent
Ahn

(10) Patent No.: US 10,388,996 B2
(45) Date of Patent: Aug. 20, 2019

(54) METHOD FOR SETTING IDENTIFICATION CODE OF ENERGY STORAGE SYSTEM

(71) Applicant: SAMSUNG SDI CO., LTD., Yongin-si, Gyeonggi-do (KR)

(72) Inventor: Sang-Kyu Ahn, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 76 days.

(21) Appl. No.: 15/690,421

(22) Filed: Aug. 30, 2017

(65) Prior Publication Data

US 2018/0019506 A1    Jan. 18, 2018

Related U.S. Application Data

(62) Division of application No. 14/868,632, filed on Sep. 29, 2015, now Pat. No. 9,755,282.

(30) Foreign Application Priority Data

Oct. 27, 2014   (KR) ........................ 10-2014-0146249

(51) Int. Cl.
| | |
|---|---|
| *H01M 10/48* | (2006.01) |
| *H01M 2/10* | (2006.01) |
| *H01M 10/42* | (2006.01) |
| *H02J 7/00* | (2006.01) |

(52) U.S. Cl.
CPC ....... *H01M 10/482* (2013.01); *H01M 2/1077* (2013.01); *H01M 10/425* (2013.01); *H01M 10/4257* (2013.01); *H02J 7/0009* (2013.01); *H01M 2220/10* (2013.01)

(58) Field of Classification Search
None
See application file for complete search history.

(56) References Cited

U.S. PATENT DOCUMENTS

| | | |
|---|---|---|
| 2008/0003494 A1 | 1/2008 | Rejman |
| 2012/0228946 A1 | 9/2012 | Sim et al. |
| 2014/0084689 A1 | 3/2014 | Jung et al. |

FOREIGN PATENT DOCUMENTS

| | | |
|---|---|---|
| CN | 101128287 A | 2/2008 |
| JP | 2002-078214 A | 3/2002 |
| KR | 10-2013-0023030 A | 3/2013 |
| KR | 10-2013-0027993 A | 3/2013 |

OTHER PUBLICATIONS

Extended European Search Report dated Mar. 22, 2016.
Chinese Search Report dated May 7, 2019, which was attached to the Chinese Office Action dated May 17, 2019, of the corresponding Chinese Patent Application No. 201510696596.8.

*Primary Examiner* — Carmen V Lyles-Irving
(74) *Attorney, Agent, or Firm* — Lee & Morse, P.C.

(57) ABSTRACT

An energy storage system includes a plurality of trays holding battery packs, each tray having a tray controller, and a switch to set an identification code to the tray, and a rack accommodating the plurality of trays, the rack having a rack controller, and fingers corresponding to each switch of the trays, the fingers selectively activating each switch when a corresponding tray is mounted on the rack.

6 Claims, 8 Drawing Sheets

METHOD FOR SETTING IDENTIFICATION CODE OF ENERGY STORAGE SYSTEM

CROSS-REFERENCE TO RELATED APPLICATIONS

This is a divisional application based on pending application Ser. No. 14/868,632, filed Sep. 29, 2015, the entire contents of which is hereby incorporated by reference.

Korean Patent Application No. 10-2014-0146249, filed on Oct. 27, 2014, in the Korean Intellectual Property Office, and entitled: "Energy Storage System and Method for Setting Identification Code to Battery Tray for the Same," is incorporated by reference herein in its entirety.

BACKGROUND

1. Field

Embodiments relate to an energy storage system which has a plurality of battery trays installed on a rack, and to a method for setting an identification code to a tray for the same.

2. Description of the Related Art

There has been research on smart grid systems which flexibly adjust supply of electricity in connection with a variety of information and communications technologies, in order to effectively eliminate mismatches between electricity usage and electricity production and prevent waste due to oversupply of electricity and overloads due to electricity supply shortage. That is, a smart grid system is equipped with an energy storage system which stores electricity when electricity consumption is low and supplies stored electricity, along with produced electricity, to consumers when electricity consumption is high.

The energy storage system is equipped with battery packs, each consisting of rechargeable batteries to store produced electricity therein. The energy storage system can be used in electric vehicle charging stations that supply electricity for charging of electric vehicles, as well as in smart grid systems.

In an example, the energy storage system may be configured by installing a plurality of battery packs on a battery tray, installing the plurality of battery trays on a rack, and keeping the plurality of racks in a container. A battery pack is configured by assembling a plurality of rechargeable batteries into a variety of structures and electrically connecting them.

In order for the energy storage system to control the batteries, communication is established between a tray BMS (battery management system) provided in a battery tray and a rack BMS. In this instance, an identification (ID) code is assigned to the tray BMS of each battery tray.

SUMMARY

An exemplary embodiment provides an energy storage system including a plurality of trays holding battery packs, each tray having a tray controller, and a switch to set an identification code to the tray, and a rack accommodating the plurality of trays, the rack having a rack controller, and fingers corresponding to each switch of the trays, the fingers selectively activating each switch when a corresponding tray is mounted on the rack.

Each switch has a plurality of holes arranged in the same pattern, and the fingers are selectively coupled to the holes of the switch.

The holes are arranged in rows and columns, and the same number of fingers as holes specified by the identification code are arranged at the positions corresponding to the holes.

The tray includes a first connector equipped with the switch, and the rack includes a second connector equipped with the fingers and coupled to the first connector.

The first and second connectors include first guide holes and second guide holes, respectively, and are fastened together by guide bolts passing through the second guide holes and then the first guide holes and nuts provided on the first connector's side.

The first connector includes fastening holes on either side, and the second connector includes coupling members to be coupled to the fastening holes.

Each fastening hole further includes a protrusion protruding toward the coupling member, and the coupling member further includes an insert hole to be coupled to the protrusion.

The switches of the plurality of trays may be identical to each other, and fingers corresponding to each switch have a unique configuration.

Each switch of a tray may have a plurality of holes arranged in a predetermined pattern, the switches of the plurality of trays have the same predetermined pattern of holes.

The rack may include a connector corresponding to each tray of the plurality of trays, each connector having a unique configuration of fingers coupled to holes in a corresponding tray.

Another exemplary embodiment provides a method for setting an identification code to a tray for an energy storage system, the method including preparing trays with no identification codes, mounting the trays on a rack, automatically assigning identification codes to the trays as fingers provided on the rack are selectively coupled to a switch provided in each tray, sending identification code data to a rack controller provided in the rack from a tray controller provided in each tray, and completing the preparation for the operation of the energy storage system.

In the preparing, trays with no identification codes, each including an identical switch, are prepared.

In the assigning, a different arrangement of fingers provided at the mounting position of each tray on the rack is coupled to the switch.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
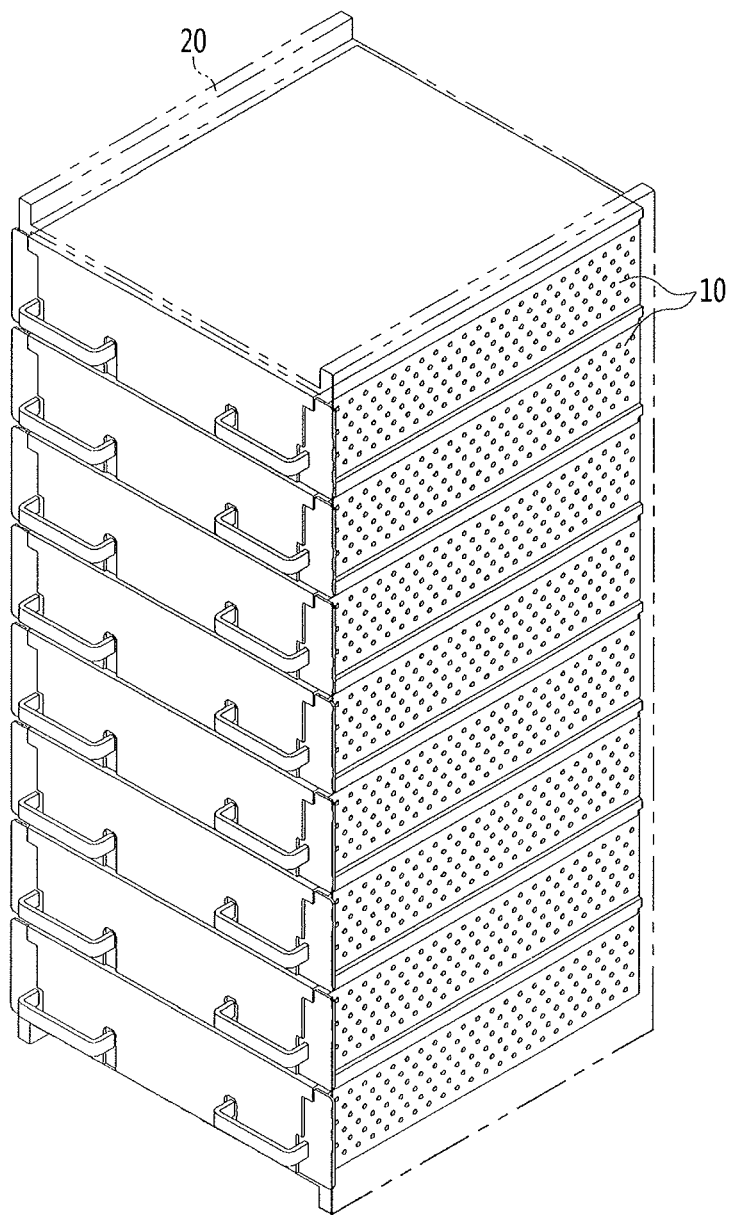
FIG. 1 illustrates a perspective view of an energy storage system according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
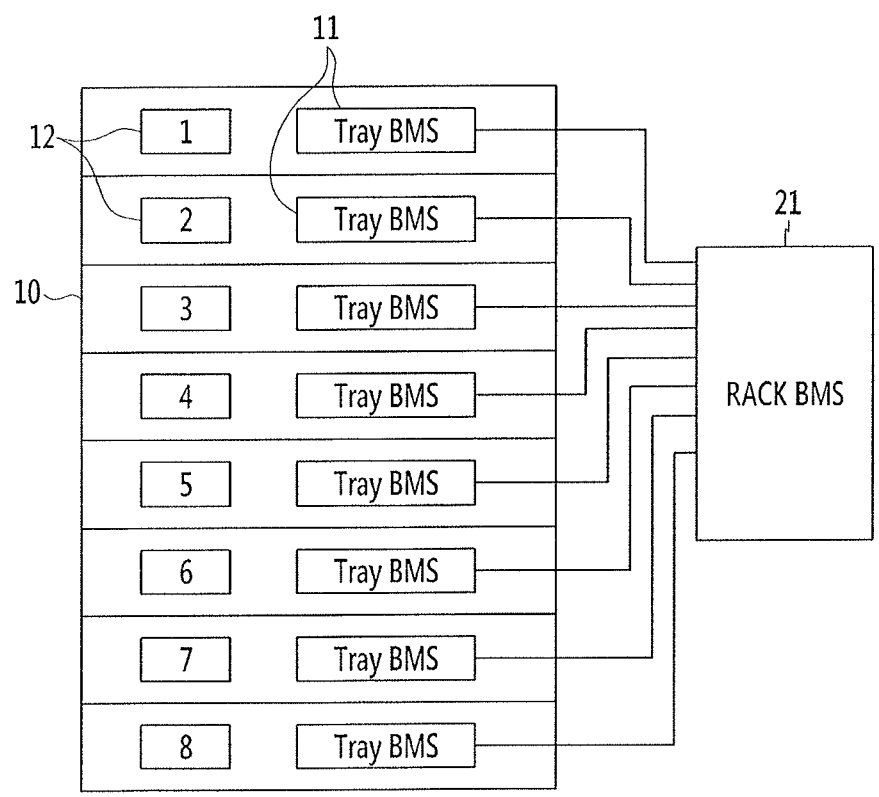
FIG. 2 illustrates a conceptual diagram of a rear view of the energy storage system of FIG. 1.

FIG. 1 is a perspective view of an energy storage system according to an exemplary embodiment, and FIG. 2 is a rear view conceptually illustrating the energy storage system of FIG. 1. Referring to FIGS. 1 and 2, the energy storage system according to the exemplary embodiment includes a plurality of battery trays 10 holding a plurality of battery packs (not shown), and a rack 20 for mounting the plurality of trays 10 thereon. In an example, the rack 20 according to the exemplary embodiment may be configured to mount eight trays 10 in a stacked structure.

Each tray 10 includes a tray controller 11 (e.g., tray BMS (battery management system)) that controls the battery packs. The rack 20 includes a rack controller 21 (e.g., a rack BMS) that controls the trays 10.

Each of the tray controllers 11 is connected to the rack controller 21 so as to be controlled by the rack controller 21. For example, the trays 10 may be connected in parallel by connecting the tray controllers 11 to the rack controller 21.

Figure 5:
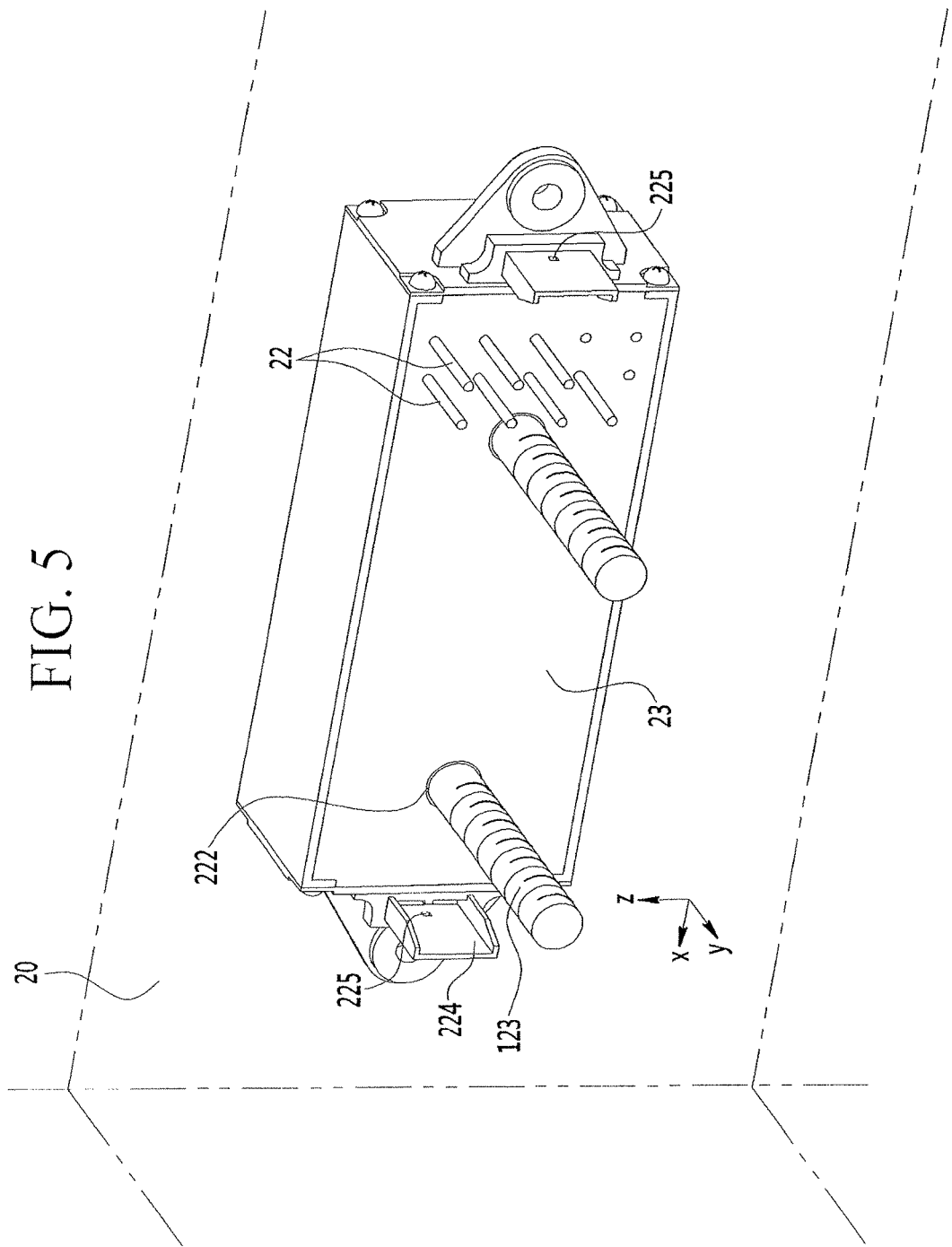
FIG. 5 illustrates a perspective view of fingers connected to the switch of FIG. 4 to activate the same.

In order for the tray controllers 11 to send identification code data for the trays 10 to the rack controller 21, each tray 10 is equipped with a switch 12, and the rack 20 is equipped with fingers 22 (see FIG. 5). An identification code represents unique position information of an individual tray 10.

The switch 12 has the same structure for every tray 10. The fingers 22 are configured to selectively activate the switch 12 of the tray 10 depending on their positions on the rack 20 when the tray 10 is mounted on the rack 20. That is, the switch 12 has the same structure for every tray 10, while the fingers 22 are arranged in different ways depending on their positions on the rack 20. In other words, the fingers 22 are partially connected to the switch 12 while corresponding to the entire range of the switch 12. For example, when the trays 10 are slidably mounted on the rack 20, unique identification codes are assigned to each tray 10 on the rack 20 as the trays 10 equipped with the switches 12 of the same structure are each connected to a different arrangement of fingers 22 formed at a position on the rack 20 where each tray 10 is mounted.

For convenience, FIG. 2 visually illustrates 1 to n (i.e., 1 to 8) identification codes for n (e.g., eight) trays in a top-down view. For example, eight trays 10 may be mounted on the rack 20, and may be automatically assigned identification codes as shown in FIG. 2.

Figure 3:
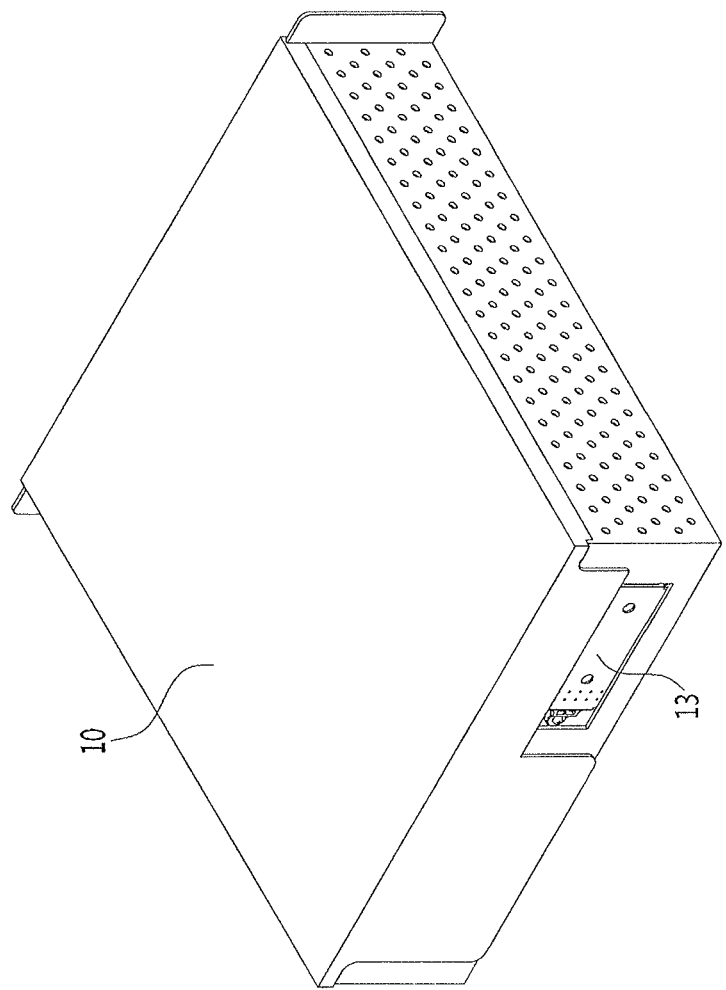
FIG. 3 illustrates a perspective view of a tray of FIG. 1.
Figure 4:
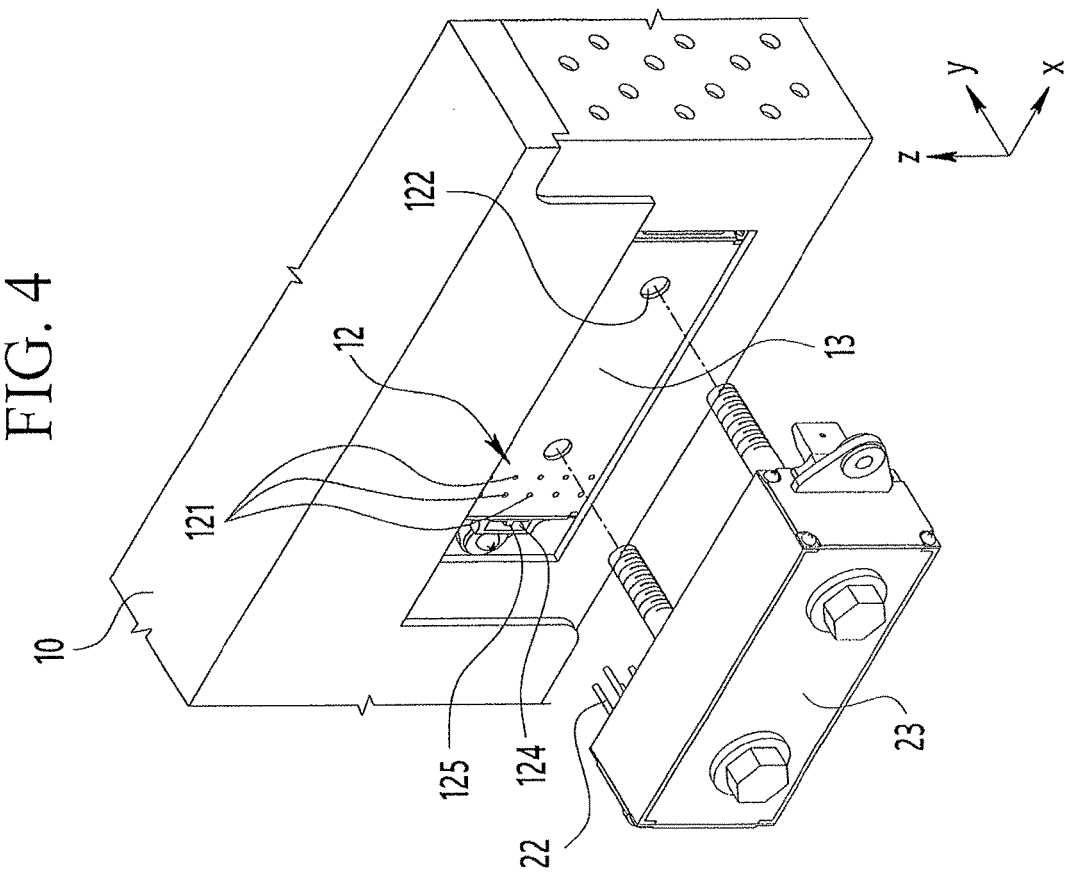
FIG. 4 illustrates a perspective view of a switch for setting an identification code in the tray of FIG. 3.

FIG. 3 is a perspective view of one tray 10 to be installed in the rack 20, and FIG. 4 is a perspective view of a switch for setting an identification code in the tray 10 of FIG. 3. Referring to FIGS. 3 and 4, the switch 12 provided in the tray 10 has a plurality of holes 121 arranged in the same pattern by way of example.

FIG. 5 is a perspective view of the fingers 22 connected to the switch 12 of FIG. 4 to activate the same. Referring to FIG. 5, the fingers 22 provided on the rack 20 are configured to selectively correspond to the holes 121 of the switch 12. Although not shown, push buttons are provided inside the holes 121 and selected when pressed by the fingers 22.

Referring back to FIGS. 4 and 5, the holes 121 constituting the switch 12 are arranged in rows and columns on the back side of the tray 10, and the same number of fingers 22 as holes 121 specified by an identification code are arranged at the positions corresponding to the holes 121. That is, the holes 121 may be arranged in the switch 12 in a matrix pattern, and a number of fingers specified by the identification code may be arranged to face corresponding holes 121, e.g., FIG. 4 illustrates the fingers 22 facing the holes 121 in the switch 12.

For example, if the holes 121 are arranged in a matrix of five rows and two columns, the fingers 22 may be arranged and coupled to the five rows and two columns of holes 121 in various combinations, so that an identification code is assigned to the tray 10. For example, as shown in FIG. 5, four fingers 22 are arranged from the top downward in a left column, and three fingers 22 are arranged from the top downward in a right column to face the holes 121 in the switch 12.

To this end, the tray 10 and the rack 20 include a first connector 13 and a second connector 23, respectively, which are slidably coupled. That is, as illustrated in FIG. 4, the fingers 22 in the second connector 23 of the rack 20 are inserted into the holes 121 (into the switch 12) in the first connector 13 of the tray 1, so that the switch 12 of the tray 10 is connected to the fingers 22 of the rack 20.

Figure 6:
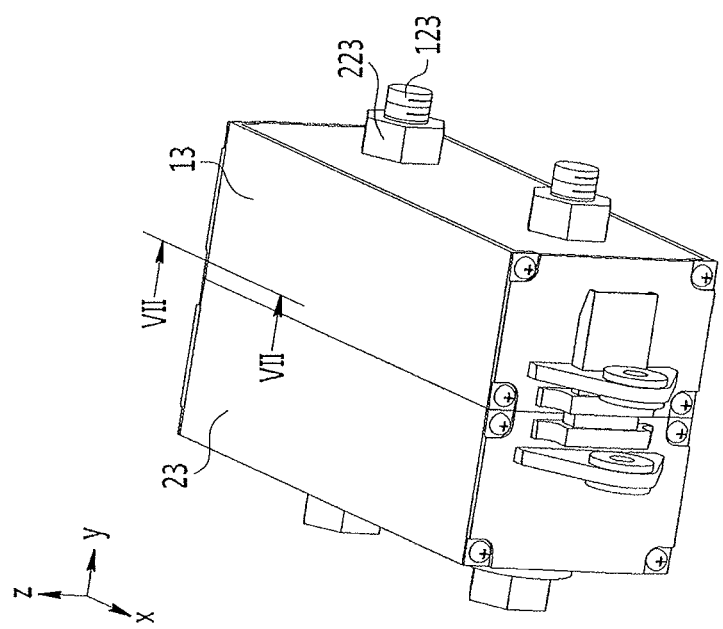
FIG. 6 illustrates a perspective view of the tray with an identification code by connecting the fingers of FIG. 5 to the switch of FIG. 4.
Figure 7:
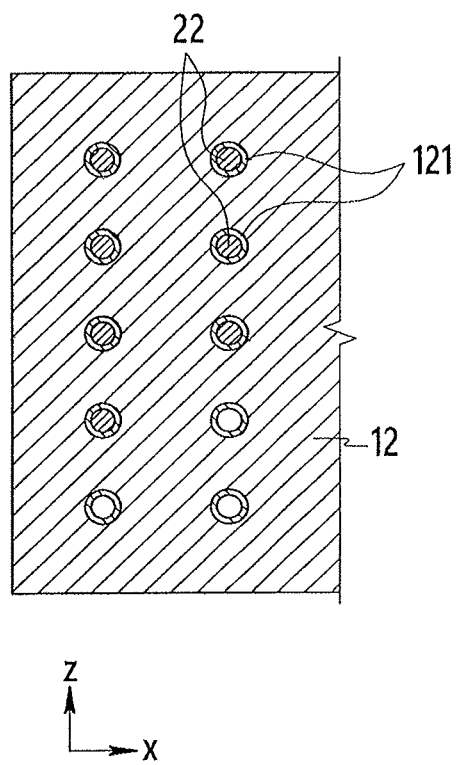
FIG. 7 illustrates a cross-sectional view taken along the line VII-VII of FIG. 6.

FIG. 6 is a perspective view of a front of the first connector 13 of the tray 10 with an identification code set to it by connecting the fingers 22 to the switch 12. FIG. 7 is a cross-sectional view taken along the line VII-VII of FIG. 6.

Referring to FIGS. 4 to 7, when the tray 10 is slidably mounted at a specific position on the rack 20, the first connector 13 provided on the tray 10 is slidably coupled to the second connector 23 provided on the rack 20. For example, the rack 20 may include a plurality of second connectors 23 corresponding to positions of trays 10 within the rack 20, so each first connector 13 of a tray 10 may be coupled to a corresponding second connector 23 within the rack 20, e.g., each second connector 23 may have a unique configuration of fingers 22 therein.

The first connector 13 is equipped with the switch 12. That is, the tray 10 includes the first connector 13, and the first connector 13 includes the switch 12. The second connector 23 is equipped with the fingers 22. That is, the rack 20 includes the second connector 23, and the second connector includes the fingers 22.

Once the tray 10 is slidably mounted on the rack 20, as the first and second connectors 13 and 23 are slidably coupled, the push buttons provided in the holes 121 are pressed by the fingers 22, thereby automatically assigning an identification code to the tray 10. In other words, the push buttons inside the holes 121 are pushed in accordance with the configuration of the inserted fingers 22, so the identification code of each tray 10 corresponds to the configuration of the fingers 22 in the corresponding second connector 23.

As illustrated in FIGS. 4-5, the first and second connectors 13 and 23 include first guide holes 122 and second guide holes 222, respectively, so as to be coupled to each other. Guide bolts 123 pass through the second guide holes 222 of the second connector 23, and then through the first guide holes 122 of the first connector 13, followed by fastening by nuts 223 (FIG. 6) to one side of the first connector 13. Accordingly, the first and second connectors 13 and 23 are initially coupled together.

The first connector 13 further includes fastening holes 124 on either side, and the second connector 23 further includes coupling members 224 to be coupled to the fastening holes 124. When the first and second connectors 13 and 23 are coupled together, the coupling members 224 are inserted into and fastened to the fastening holes 124. Accordingly, the first and second connectors 13 and 23 are secondarily coupled more tightly.

Each fastening hole 124 includes a protrusion 125 protruding toward the side of the coupling member 224 to be inserted, and the coupling member 224 includes an insert hole 225 to be coupled to the protrusion 125. When the coupling member 224 is coupled to the fastening hole 124, the protrusion 124 is coupled to the insert hole 225 of the coupling member 224. Accordingly, the fastening hole 124 and the coupling member 224 are fastened together more firmly.

Once the first and second connectors 13 and 23 are fastened together in this manner, only some holes 121 corresponding to the fingers 22, of all the holes 121 constituting the switch 12, are coupled to the fingers 22, and the other holes 121 remain without the fingers 22. For example, as illustrated in FIG. 7, only four holes 121 in the left column and three holes 121 in the right column include fingers 22 (in view of the configuration of fingers 22 in FIG. 5), so three of the holes 121 in the switch 12 remain empty. That is, a unique identification code is assigned to each tray 10 in accordance with the unique configuration of the fingers 22.

Figure 8:
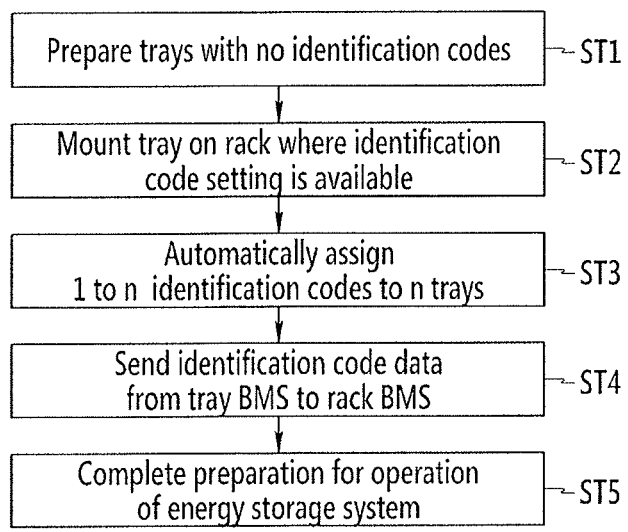
FIG. 8 illustrates a flowchart of a method for setting an identification code to a tray for an energy storage system according to an exemplary embodiment.

FIG. 8 is a flowchart of a method for setting an identification code to a tray for an energy storage system according to an exemplary embodiment. In this method, when the tray 10 is slidably mounted on the rack 20, an identification code is automatically assigned to the tray 10.

Referring to FIG. 8, the method for setting an identification code to the tray 10 for an energy storage system includes preparing the trays 10 (operation ST1), mounting the trays 10 on the rack 20 (operation ST2), assigning identification codes to the trays 10 (operation ST3), sending identification code data (operation ST4), and completing the process (operation ST5).

When preparing the trays 10 in operation ST1, a number of trays 10 with no identification codes, corresponding to the number of mounting portions provided on the rack 20, are prepared. Each tray 10 is equipped with an identical switch 12 on the first connector 13. That is, the trays 10 and the first connectors 13 have a uniform structure, respectively.

In operation ST2, the trays 10 are slidably mounted on the rack 20 where identification code setting is available. Each of the second connectors 23 of the rack 20 is equipped with a different arrangement of fingers 22 used to set an identification code, e.g., each of the second connectors 23 in the rack 20 includes a unique arrangement of fingers 22. The fingers 22 are configured to set a different identification code depending on where the mounting portion is located on the second connector 23 of the rack 20.

In operation ST3, fingers 22 of the rack 20 are coupled to the switch 12 provided in each tray 10. In this instance, as a different arrangement of fingers 22 is selectively coupled to the holes 121 of the switch 12, an identification code is automatically assigned to each tray 10 that is mounted in the rack 20. That is, the switch 12 of each tray 10 is coupled to fingers 22 of the rack 20 in different ways, thereby assigning 1 to n, e.g., 1 to 8, identification codes to the trays 10.

In operation ST4, once the fingers 22 are coupled to the switch 12, the tray controller 11 provided in the tray 10 connected to the switch 12 sends identification code data to the rack controller 21 connected to the fingers 22 and provided in the rack 20. That is, data of the identification code set by the switch 12 and the fingers 22 is sent to the tray controller 11, and forwarded to the rack controller 21 from the tray controller 21.

In operation ST5, the preparation for the operation of the energy storage system is complete when the rack controller 21 receives identification code data of all the trays 10 from the tray controllers 11.

As such, the energy storage system requires no process of disassembling and reassembling the tray 10 when setting an identification code to the tray 10. As consumers do not have to disassemble the tray 10, leakage of technology or damage to the void label can be avoided. Moreover, the trays 10 come in only one type, which improves the failure rate of trays 10 mounted on the rack 20 and makes it easy to manage the products. Developers can set an identification code to a tray 10 by changing the structures of the rack 20 and the fingers 22, without communication sequence alteration or circuit modification.

By way of summation and review, in a conventional energy storage system, an identification code is assigned to a tray BMS according to the setting of a jumper or DIP switch provided in the tray BMS. To this end, the operator can identify the tray BMS and set an identification code to the tray BMS after removing the tray cover and then the tray BMS cover and separating different types of wire harnesses. However, with the identification code assigned to the tray BMS, the process of disassembling and reassembling the tray may be complicated and difficult. Moreover, in case of leakage of technology while disassembling the tray, or in case of damage to a void label, it can be difficult to clarify where the responsibility lies if something goes wrong with the product or a problem occurs in the future.

In contrast, according to embodiments, an energy storage system automatically assigns an identification code to a battery tray, when the battery trays are installed on a rack. That is, a switch for setting an identification code is provided on a battery tray, and is selectively activated by fingers provided on a rack. As such, when the tray is mounted on the rack, the switch of the tray is selectively coupled to the fingers of the rack, thus automatically assigning the identification code to the battery tray. Further, a method for setting an identification code to a tray for the energy storage system is provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for setting an identification code to a tray of an energy storage system, the method comprising:
   preparing trays with no identification codes;
   mounting the trays on a rack;
   automatically assigning identification codes to the trays, as fingers provided on the rack are selectively coupled to a switch in each tray; and
   sending identification code data to a rack controller in the rack from a tray controller each tray,
   wherein each tray has an identical switch, and
   wherein fingers corresponding to each switch have a unique configuration.

2. The method as claimed in claim 1, wherein automatically assigning identification codes includes providing a different arrangement of fingers at a mounting position of each tray on the rack to be coupled to the switch.

3. The method as claimed in claim 1, wherein each tray includes a first connector including the switch, and the rack includes a second connector including the fingers, wherein mounting includes coupling the second connector and the first connector.

4. The method as claimed in claim 3, wherein the first and second connectors includes first guide holes and second guide holes, respectively, wherein coupling the first and second connectors includes inserting guide bolts passing through the first and second guide holes, and fastening nuts on the guide bolts at a side of the first connector.

5. The method as claimed in claim 3, wherein the first connector includes fastening boles at opposite sides thereof, and the second connector includes coupling members, wherein coupling the first and second connectors includes coupling the coupling members and the fastening holes.

6. The method as claimed in claim 1, wherein each switch has a plurality of holes arranged in a same pattern, and selectively coupling the fingers to the holes of the switch.

\* \* \* \* \*